(12) United States Patent
Ageishi

(10) Patent No.: US 8,601,215 B2
(45) Date of Patent: Dec. 3, 2013

(54) PROCESSOR, SERVER SYSTEM, AND METHOD FOR ADDING A PROCESSOR

(75) Inventor: Daisuke Ageishi, Tokyo (JP)

(73) Assignee: NEC Corporation, Tokyo (JP)

( * ) Notice: Subject to any disclaimer, the term of this patent is extended or adjusted under 35 U.S.C. 154(b) by 478 days.

(21) Appl. No.: 12/698,593

(22) Filed: Feb. 2, 2010

(65) Prior Publication Data

US 2010/0241809 A1 Sep. 23, 2010

(30) Foreign Application Priority Data

Mar. 23, 2009 (JP) ................................. 2009-069410

(51) Int. Cl.
*G06F 12/00* (2006.01)
(52) U.S. Cl.
USPC ............................................. 711/129; 713/2
(58) Field of Classification Search
USPC ........................................................... 713/2
See application file for complete search history.

(56) References Cited

U.S. PATENT DOCUMENTS

| | | | |
|---|---|---|---|
| 5,155,833 A | * | 10/1992 | Cullison et al. ................... 713/2 |
| 5,496,349 A | * | 3/1996 | Campbell et al. ................ 607/5 |
| 5,793,945 A | * | 8/1998 | Tabata et al. ..................... 714/25 |
| 6,081,890 A | * | 6/2000 | Datta ................................ 713/1 |
| 6,128,690 A | * | 10/2000 | Purcell et al. ................. 710/240 |
| 2008/0244256 A1 | * | 10/2008 | Cai et al. ........................... 713/2 |

FOREIGN PATENT DOCUMENTS

| | | |
|---|---|---|
| JP | 3-32143 A | 2/1991 |
| JP | 6-67991 A | 3/1994 |
| JP | 8-54966 A | 2/1996 |
| JP | 2513769 B | 4/1996 |
| JP | 10-31620 A | 2/1998 |
| JP | 10-171676 A | 6/1998 |
| JP | 2007109150 A | 4/2007 |

OTHER PUBLICATIONS

Japanese Office Action for JP2009-069410 dated Mar. 29, 2011.

* cited by examiner

*Primary Examiner* — Larry Mackall

(57) ABSTRACT

A processor according to an exemplary of the invention includes a first initialization unit which reads a first program for checking a reliability of the processor into a cache memory and executes the first program when the processor is started up, and a second initialization unit which reads a second program for checking a reliability of the cache memory into a predetermined memory area and executes the second program when the second initialization unit receives a notification indicating the completion of the establishment of a communication path between the predetermined memory area and the processor from another processor which exists in a partition in which the processor is added.

16 Claims, 7 Drawing Sheets

PROCESSOR, SERVER SYSTEM, AND METHOD FOR ADDING A PROCESSOR

This application is based upon and claims the benefit of priority from Japanese Patent Application No. 2009-069410, filed on Mar. 23, 2009, the disclosure of which is incorporated herein in its entirety by reference.

TECHNICAL FIELD

The present invention relates to a processor, a server system, a method for adding a processor.

BACKGROUND ART

In recent years, a server which can be partitioned into multiple physical partitions in a chassis has received a lot of attention. In such server, all the partitions in the chassis are completely electrically separated with each other. Each partition can be operated as an independent server. Therefore, by using such technology, the servers can be integrated without affecting each other. The server in which physical partitioning can be implemented has a function with which a processor can be dynamically added to the physical partition in a unit so-called a cell which has a processor and a memory.

FIG. 6 is a block diagram showing a configuration of a system which is configured by a cell unit that is a module including a processor and a memory. In the system shown in FIG. 6, each of the cells includes two processors and two memories that correspond to the processors, respectively. Each processor accesses the memory through a bus.

In such system, the processor is dynamically added by a cell unit. In this case, first, an administrator starts up the additional cell as a spare partition. After an initialization process of the processor in the cell has been completed, the administrator installs the cell in the partition physically.

There are two reasons for starting up the cell unit as the spare partition. The first reason is the restriction on the initialization of the additional processor. The second reason is to check whether the processor is reliable in advance.

The restriction on the initialization of the additional processor is that a memory is required for the initialization of the additional processor. The initialization process of the processor typified by Itanium is performed by the PAL (Physics Abstraction Layer) developed by a processor vendor that is an unopened code and the SAL (System Abstraction Layer) developed by the BIOS (Basic Input/Output System) vendor. A procedure of the initialization process of the processor using the PAL and the SAL is specified as the specification. Accordingly, when a user wants to add the spare processor, the user has to follow the specified procedure for performing the initialization process of the processor. The initialization process of the processor includes not only setting of a value required for operating the processor but also failure diagnosing to check the reliability of the processor. The memory is required for the failure diagnosing. When the spare processor is added, a memory for initialization of the processor has to be provided in the additional cell initially because the additional processor can not be accessed from outside during the initialization process.

Thus, there is a restriction on which the memory for the initialization process has to be added together with the additional processor, when the processor is dynamically added to the partition.

For example, a technology for dynamically adding a processor is disclosed in Japanese Patent Application Laid-Open No. 1991-32143. In this technology, when a host processor completes a hardware connection of an additional local processor and all preparations have been completed, the host processor reads out a system file from an external storage device. Next, the host processor loads an initial program to the additional local processor and issues a command to start up a system. Next, the host processor transmits a local processor diagnostic program and issues a command to perform device diagnosis of the additional local processor. Thus, a memory into which the local processor diagnostic program is loaded by the host processor is required in the additional local processor when the additional local processor is added.

Thus, when a processor is dynamically added, a memory for the initialization of the processor has to be added together with the processor. Accordingly, even when a user needs new processor alone, the user has to purchase a memory as well as the processor. Therefore, the user has a difficulty in flexibly modifying a system configuration.

A microcomputer system in which the initialization of a CPU (Central Processing Unit) in a microcomputer board is performed without using a CALL/RET instruction that uses a RAM (Random Access Memory) in order to prevent runaway caused by RAM abnormality is disclosed in Japanese Patent Application Laid-Open No. 1996-054966.

A system configuration control device with which the processing time of configuration control commands is shortened by enabling a memory access from an additional device to a main storage device before the device is logically added to a system is disclosed in Japanese Patent Publication No. 2513769.

FIG. 7 shows a configuration of the Itanium processor. The Itanium processor employs the CSI (Common System Interface). As shown in FIG. 7, the processor employing the CSI includes a CSR (Control Status Register), a memory and a DCROM (Direct Connect Read Only Memory). The CSR is a register of the processor employing the CSI. The memory is used when the processor performs some processes. The DCROM is a nonvolatile memory and stores BIOS firmware for initializing a processor. The processors establish links each other to communicate with each other. Each processor communicates with a NC (Node controller). The processors which employ the CSI can read the DCROM before establishing links each other because the processors employing the CSI each have the DCROM.

A case in which a processor employing the CSI is dynamically added to a system which includes a processor employing the CSI will be described. Here, the case in which a processor which does not have a memory is dynamically added will be described. That is, the case in which the processor including only the CSR and the DCROM is added to the system shown in FIG. 7 will be described. In this case, the processor to be added uses the memory provided in the processor in the system for an initialization process.

As mentioned above, when the processor is dynamically added, the addition of the processor has to be performed after checking the reliability of the additional processor beforehand. Accordingly, an environment in which the additional processor can be started up in an independent memory space from a memory space in which the processor is started up is necessary.

However, as mentioned above, the case in which the additional processor uses a memory provided in the processor in the system in which the additional processor is added to initialize the additional processor, a link between the memory provided in the operating processor and the additional processor is established before checking the reliability of the additional processor. In other words, the case in which the processor with no memory is dynamically added to the system as shown in FIG. 6, the additional processor can not be started up in the independent memory space from the operating processor and the check of the reliability of the additional processor can not be performed before the addition of the additional processor. Therefore, when the additional processor operates improperly, it may affect the processor in the system in which the additional processor is added. Accordingly, there is a problem that the processor with no memory can not be dynamically added to the system including the processor employing the CSI as shown in FIG. 7 as well as to the system that is composed of cell units as shown in FIG. 6.

SUMMARY

An exemplary object of the present invention is to provide a processor, a server system, a method for adding a processor which can be dynamically added to a server system without affecting another processor to which the processor is added even when the processor does not have a memory for an initialization process.

A processor according to an exemplary of the invention includes a first initialization unit which reads a first program for checking a reliability of the processor into a cache memory and executes the first program when the processor is started up, and a second initialization unit which reads a second program for checking a reliability of the cache memory into a predetermined memory area and executes the second program when the second initialization unit receives a notification indicating the completion of the establishment of a communication path between the predetermined memory area and the processor from another processor which exists in a partition in which the processor is added.

A server system according to an exemplary of the invention includes a first processor and a second processor which exists in a partition in which the first processor is added, wherein the second processor includes a memory allocating unit which allocates a memory area for the initialization of the first processor when a notification indicating the addition of the first processor to the partition in which the second processor exists is received; and a routing unit which establishes a communication path between the allocated memory area and the first processor and notifies the first processor of the completion of the establishment of the communication path and the first processor includes: a first initialization unit which reads a first program for checking the reliability of the first processor into a cache memory and executes the first program when the first processor is started up; and a second initialization unit which reads a second program for checking the reliability of the cache memory into the memory area and executes the second program when a notification indicating the completion of the establishment of the communication path is received from the second processor.

A method for adding a processor according to an exemplary of the invention includes the steps of reading a first program for checking a reliability of a first processor into a cache memory and executing the first program; reading a second program for checking a reliability of the cache memory into a predetermined memory area and executing the second program when a notification indicating the completion of the establishment of a communication path between the predetermined memory area and a first processor is received from a second processor which exists in a partition in which the first processor is added.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, a detailed explanation will be given for a first exemplary embodiment with reference to the drawings.

First Exemplary Embodiment

Figure 1:
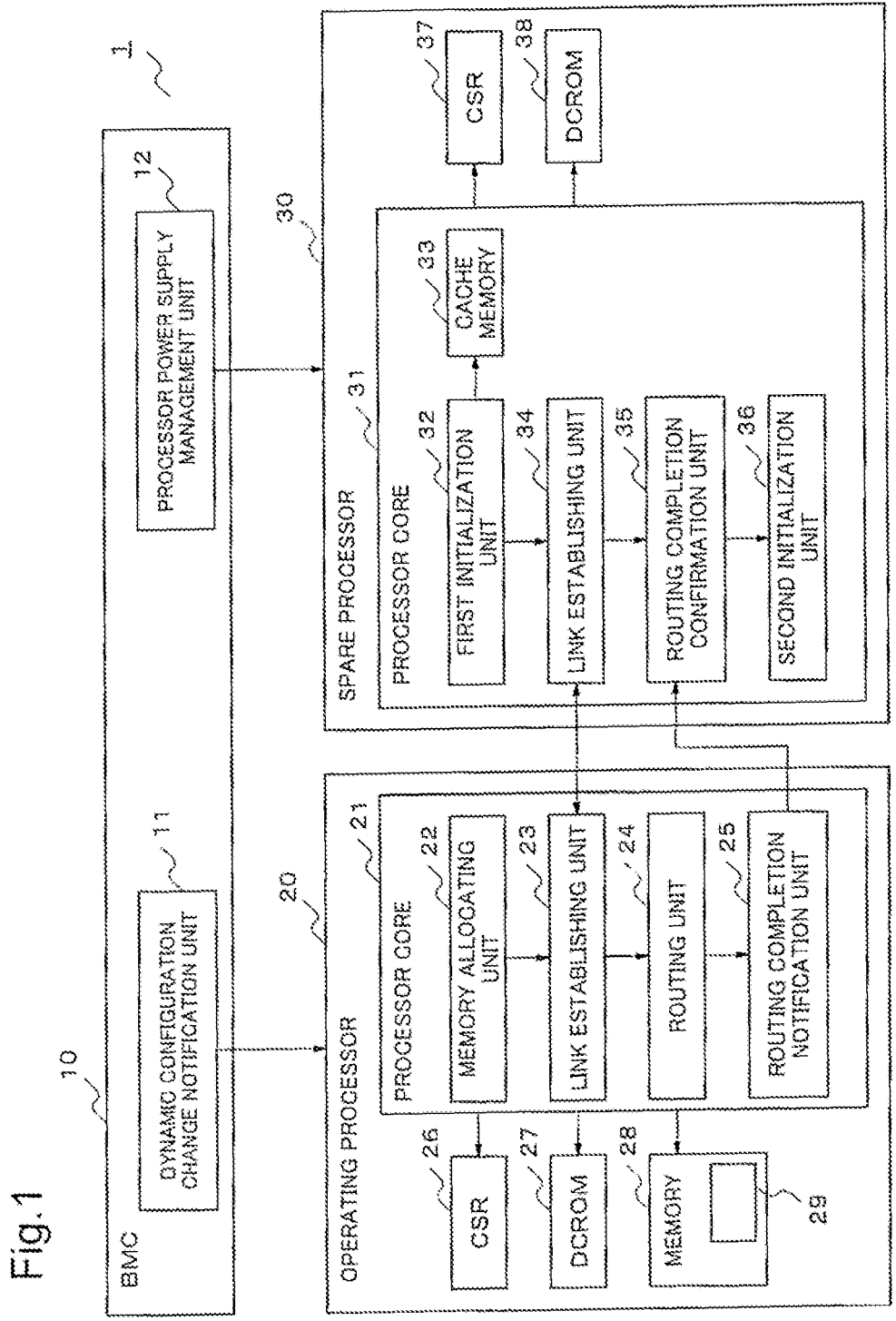
FIG. 1 is a block diagram showing a server system according to a first exemplary embodiment of the present invention.
Figure 7:
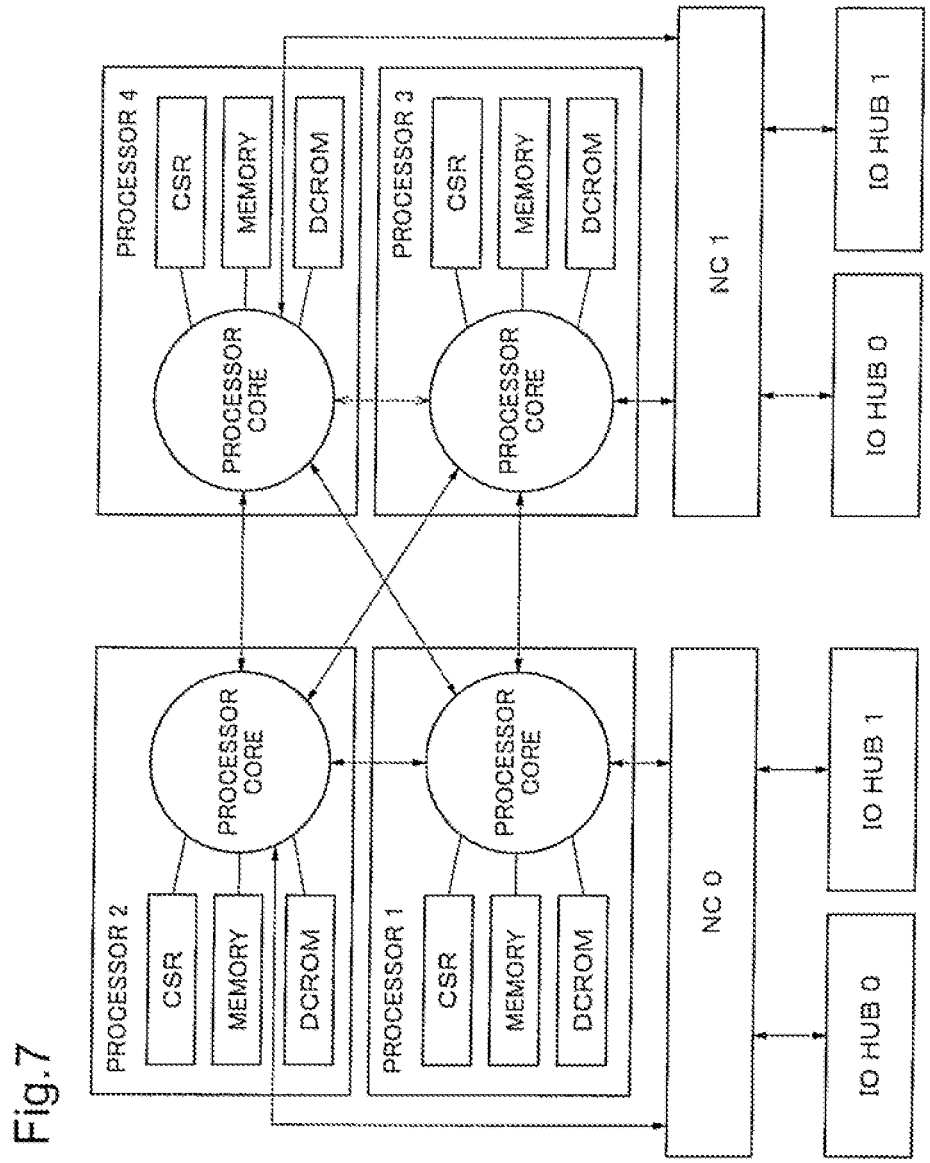
FIG. 7 shows a configuration of the Itanium processor.

FIG. 1 is a block diagram showing a server system 1 according to a first exemplary embodiment of the present invention. The server system 1 includes a BMC (Baseboard Management Controller) 10 and an operating processor (second processor) 20. The BMC 10 manages the server system 1. The operating processor 20 is a processor in a certain partition of the server system 1. In the first exemplary embodiment, a case in which a spare processor (first processor) 30 with no memory is dynamically added to the partition in which the operating processor 20 is included will be described. The operating processor 20 and the spare processor 30 each employ the CSI shown in FIG. 7.

The server system 1 according to the first exemplary embodiment performs a first initialization process in which the reliability of the spare processor 30 is checked before adding the spare processor 30 to the operating processor 20. The server system 1 performs a second initialization process after adding the spare processor 30 to the operating processor 20. Hereinafter, this will be described in detail.

The BMC 10 includes a dynamic configuration change notification unit 11 and a processor power supply management unit 12. The dynamic configuration change notification unit 11 detects the dynamic configuration change of the server system 1 and notifies it of the operating partition. The processor power supply management unit 12 manages a power supply of the spare processor 30.

The operating processor 20 includes a processor core 21, a CSR 26, a DCROM 27 and a memory 28. The spare processor 30 includes a processor core 31, a CSR 37, and a DCROM 38.

The CSRs 26 and 37 are registers of the operating processor 20 and the spare processor 30, respectively. The DCROMs 27 and 38 are non-volatile memories that store BIOS firmware for initializing the operating processor 20 and the spare processor 30, respectively. The memory 28 is a memory which is used when the processor core 21 performs some processes. The spare processor 30 does not have a memory.

The processor core 21 in the operating processor 20 includes a memory allocating unit 22, a link establishing unit 23, a routing unit 24 and a routing completion notification unit 25.

The processor core 31 includes a first initialization unit 32, a cache memory 33, a link establishing unit 34, a routing completion confirmation unit 35 and a second initialization unit 36.

The memory allocating unit 22 allocates a memory area 29 in the memory 28 which is used for initialization process of the spare processor 30 when it is added to the operating processor 20. The link establishing unit 23 establishes a link between the operating processor 20 and the spare processor 30 together with the link establishing unit 34 of the spare processor 30. In this process, the link in a physical layer is established. The routing unit 24 routes a destination of communication so that the operating processor 20 and the spare processor 30 between which the link is established in the physical layer can logically access each other. The routing is performed in a network layer. At that time, the routing unit 24 establishes a communication path so that the second initialization unit 36 can access the memory area 29 that is allocated by the memory allocating unit 22 for the initialization process of the spare processor 30. The routing completion notification unit 25 notifies the spare processor 30 of the completion of the establishment of the communication path established by the routing unit 24.

The first initialization unit 32 of the spare processor 30 performs a first initialization process that does not require a memory out of all the initialization processes of the processor (described in detail later). The link establishing unit 34 establishes a link between the operating processor 20 and the spare processor 30 together with the link establishing unit 23 of the operating processor 20. In this case, the link in the physical layer is established. The routing completion confirmation unit 35 confirms that the routing from the spare processor 30 to a partition in which the spare processor 30 is added has been completed. Specifically, when the routing completion confirmation unit 35 receives a notification indicating the completion of the routing from the routing completion notification unit 25, the routing completion confirmation unit 35 recognizes that the routing has been completed. The second initialization unit 36 performs a second initialization process of the spare processor 30 using the memory area 29 in the memory 28 that is allocated by the memory allocating unit 22 (described in detail later).

Next, the initialization process will be described.

As mentioned above, the first initialization process and the second initialization process included in the initialization processes of the spare processor 30 are individually performed in the server system 1. The first initialization process does not include processes that require a memory. The second initialization includes processes that require a memory.

Specifically, the first initialization process includes a setting for operation of the spare processor 30 and a checking of the reliability of the CSR 37 or other units in the processor. The first initialization process is performed by the first initialization unit 32 of the spare processor 30. The DCROM 38 stores an instruction codes for executing the first initialization process. The first initialization unit 32 reads the instruction codes for the first initialization process from the DCROM 38 into the cache memory 33 and executes them. Through this process, the setting for operation of the spare processor 30 and the checking of the reliability of the spare processor 30 are performed and it is ensured that the spare processor 30 can operate properly. Thus, the processor employing the CSI can read information stored in the DCROM before establishing a link between the processors.

On the other hand, the second initialization process includes processes that are not performed in the first initialization process. The second initialization process is performed by the second initialization unit 36 of the spare processor 30. Specifically, the second initialization unit 36 checks the reliability of the cache memory 33 which was used in the first initialization process. The check of the reliability of the cache memory 33 is performed by the PAL developed by a processor vendor. Therefore, the second initialization unit 36 performs the check of the reliability of the cache memory 33 by calling the PAL and designating a memory area for the check by the SAL which is used by a BIOS developer. The instruction codes for the checking are stored in the DCROM 38. The second initialization unit 36 reads the instruction codes from DCROM 38 into the memory area 29 and executes them. The second initialization unit 36 checks the reliability of the cache memory 33 by confirming whether usual operations of the cache memory 33, that is, buffering of information can be executed or not through the execution of the instruction codes.

Next, a process for adding the spare processor 30 in the server system 1 will be described in detail.

Figure 2:
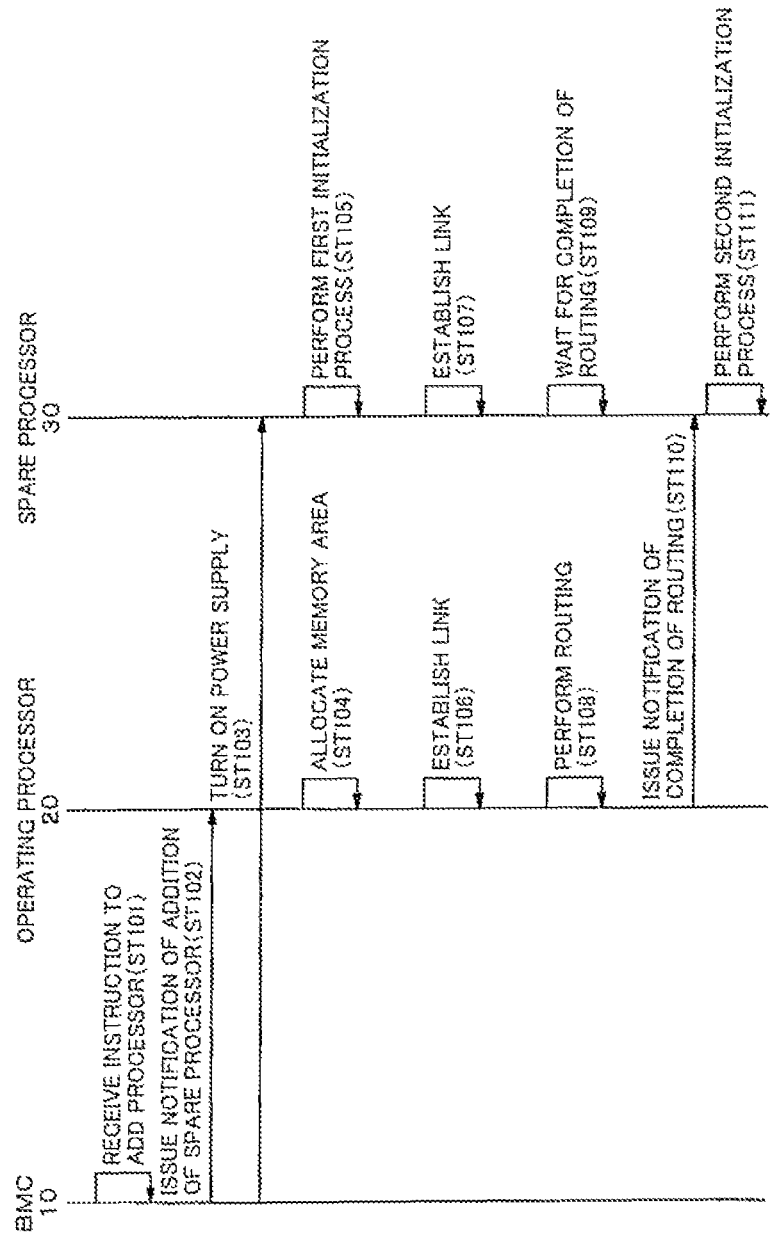
FIG. 2 is a timing chart showing a flow of a process for adding a spare processor to a server system.

FIG. 2 is a timing chart showing a flow of a process for adding the spare processor 30 to the server system 1. The process for adding the spare processor 30 to the server system 1 will be described with reference to FIG. 2.

A user instructs the BMC 10 to add the spare processor 30 to the operating partition and connects physically the spare processor 30 to the server system 1. In response to the above instruction (step ST101), the dynamic configuration change notification unit 11 of the BMC 10 notifies the operating processor 20 in the operating partition that the spare processor 30 will be added (step ST102). The processor power supply management unit 12 of the BMC 10 turns on a power supply of the spare processor 30 (step ST103).

When the operating processor 20 receives the instruction for adding the spare processor 30, the memory allocating unit 22 allocates the memory area 29 which is required for the initialization process of the spare processor 30 (step ST104).

The power-supplied spare processor 30 performs the first initialization process by the first initialization unit 32 (step ST105). As mentioned above, the first initialization unit 32 reads the instruction codes stored in the DCROM 38 into the cache memory 33 and executes them.

When the memory allocating unit 22 allocates the memory area and the first initialization unit 32 completes the first initialization process, the link establishing units 23 and 34 establish the link each other in the physical layer (step ST106 and ST107).

When the link has been established, the routing unit 24 of the operating processor 20 performs a routing (step ST108). That is, the routing unit 24 establishes a communication path so that the operating processor 20 and the spare processor 30 which are linked each other in the physical layer by the link establishing units 23 and 34 can logically access each other. The routing unit 24 determines a path so that the second initialization unit 36 can logically access the memory area 29 allocated by the memory allocating unit 22. While the routing unit 24 performs the routing, the routing completion confirmation unit 35 waits for the completion of the routing (step ST109).

When the routing has been completed, the routing unit 24 notifies the routing completion notification unit 25 of the completion of the routing. The routing completion notification unit 25 notifies the spare processor 30 of the completion of the routing in response to the above-mentioned notification (step ST110). When the routing completion confirmation unit 35 receives the above-mentioned notification, the routing completion confirmation unit 35 notifies the second initialization unit 36 of the completion of the routing.

When the second initialization unit 36 receives the above-mentioned notification, it starts to perform the second initialization process using the memory area 29 (step ST111). That is, the second initialization unit 36 checks the reliability of the cache memory 33 which was used in the first initialization process. As mentioned above, the second initialization unit 36 reads the instruction codes stored in the DCROM 38 into the memory area 29 and executes them.

When the second initialization process has been normally completed, the second initialization unit 36 may notify the BMC 10 of the completion of the process. By the above mentioned procedure, the check of the reliability of the spare processor 30 and the addition of the spare processor 30 to the operating processor 20 are completed.

Note that although the spare processor 30 may operate improperly during the first initialization process if the cache memory 33 has failures, it does not affect the partition in which the spare processor 30 is added because the routing process has not been initiated yet. Further, even if the processor has completed the first initialization process and started the second initialization process with having failures in the cache memory 33, it does not operate improperly unless it use the cache memory 33 for usual operations, that is, buffering of information or the like because the first initialization process has been already completed. Even if the cache memory 33 has failures, it does not affect the partition in which the spare processor 30 is added because the timing that the cache memory 33 is used for usual operations is at or after the second initialization process.

The memory area 29 may be used for checking process that is performed when some failures occur in the spare processor 30.

As mentioned above, in the first exemplary embodiment, when the user instructs the server system 1 to be added the spare processor 30, the memory allocating unit 22 of the operating processor 20 allocates the memory area 29 for the initialization of the spare processor 30. The routing unit 24 establishes the communication path between the operating processor 20 and the spare processor 30 and establishes the communication path between the memory area 29 and the second initialization unit 36. The first initialization unit 32 reads the program for checking the reliability of the processor into the cache memory 33 and executes the program to perform the setting of the spare processor 30 and the check of the reliability of units in the spare processor 30. The second initialization unit 36 reads the program for checking the reliability of the cache memory 33 into the memory area 29 and executes the program to check the reliability of the cache memory 33. This configuration has advantages in which when the spare processor 30 is dynamically added in the partition in which the spare processor is added, a user can add the spare processor 30 without adding an additional memory and without affecting the partition in which the spare processor 30 is added.

Accordingly, it has further advantages in which because the user can dynamically add the processor alone to the partition, modification of the system configuration can be flexibly performed. Furthermore, it has advantages in which the user can dynamically add the spare processor to a system in which the spare processor and a partition in which the spare processor is added are not independent each other.

Second Exemplary Embodiment

As described in the first exemplary embodiment, in the server system 1, the setting for operation of the spare processor 30 and the check of the reliability of the spare processor 30 are performed in the first initialization process. The check of the reliability of the cache memory 33 which is used for the first initialization process is performed in the second initialization process by using the memory area 29 in the operating processor 20.

Therefore, although failures occurred during the first initialization process do not affect the outside of the spare processor 30, failures occurred during the second initialization process may affect the partition in which the spare processor 30 is added. In the second exemplary embodiment, controlling the influence of the failure which occurs during the second initialization process on the partition in which the spare processor is added will be described below.

Figure 3:
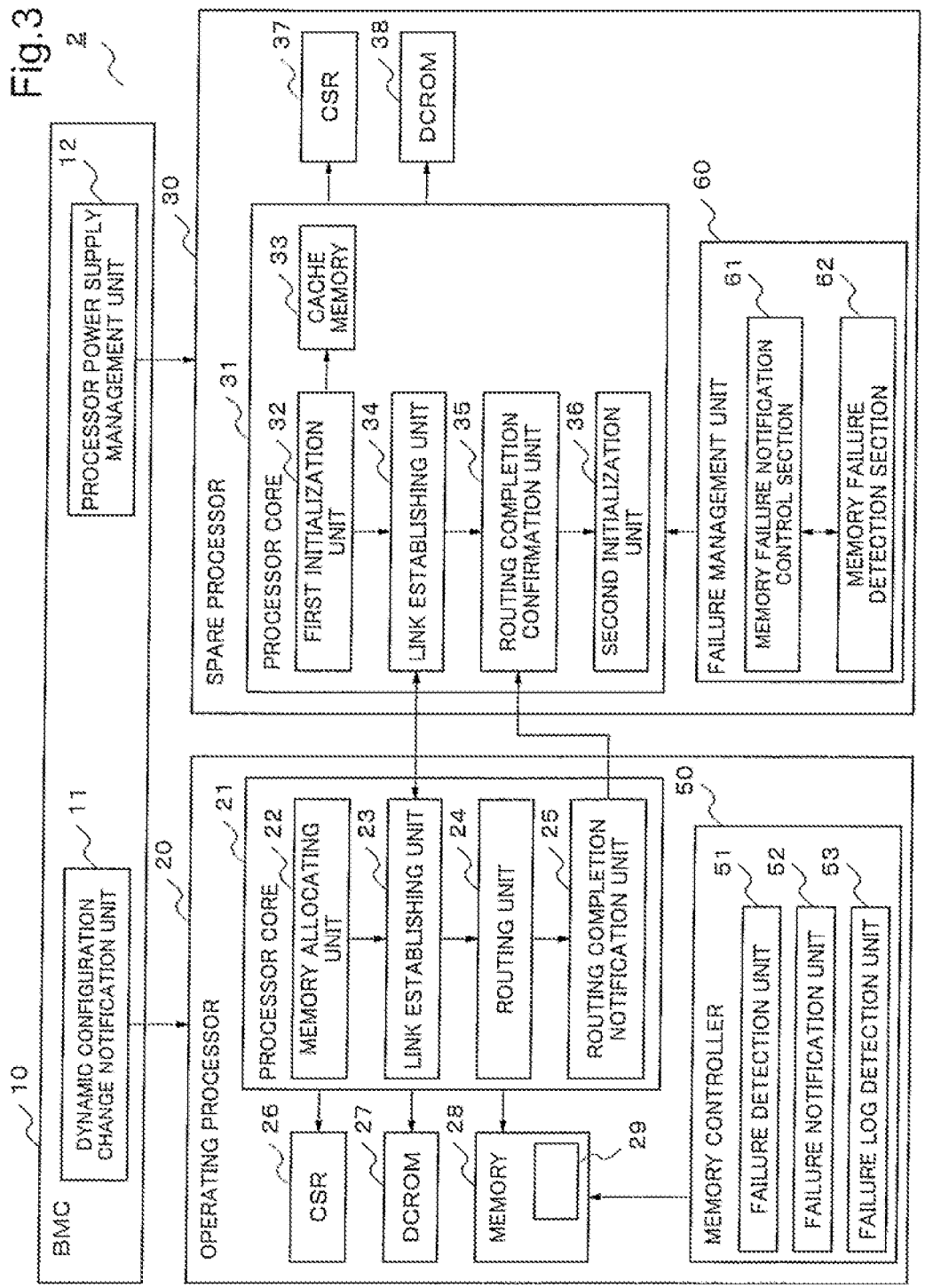
FIG. 3 is a block diagram showing a configuration of a server system according to a second exemplary embodiment of the present invention.

FIG. 3 is a block diagram showing a configuration of a server system 2 according to the second exemplary embodiment. The operating processor 20 in the server system 2 further includes a memory controller 50 besides that in the server system 1 shown in FIG. 1. The spare processor 30 in the server system 2 further includes a failure management unit 60 besides that in the server system 1. The functions of all the components other than the memory controller 50 and the failure management unit 60 in the server system 2 are the same as those of the server system 1 described in the first exemplary embodiment.

The memory controller 50 manages the memory 28 by using a conventional technology. The memory controller 50 includes a failure detection unit 51, a failure notification unit 52 and a failure log detection unit 53. The failure detection unit 51 detects a failure that occurs in the memory 28. The failure notification unit 52 notifies a control circuit (not shown) or the like of the operating processor 20 of the occurrence of a failure of the memory 28. The failure log detection unit 53 outputs log data when a failure occurs in the memory 28.

When a failure occurs in the memory area 29 during the second initialization process which is performed by the second initialization unit 36, the failure management unit 60 responds to the failure. The failure management unit 60 includes a memory failure notification control section (failure notification control section) 61 and a memory failure detection section (addition cancellation section) 62. The memory failure notification control section 61 disables or enables a function of the failure notification unit 52 in the memory controller 50. The memory failure detection section 62 cancels the addition of the spare processor 30 when the memory failure detection section 62 detects the occurrence of a failure of the memory area 29.

Figure 4:
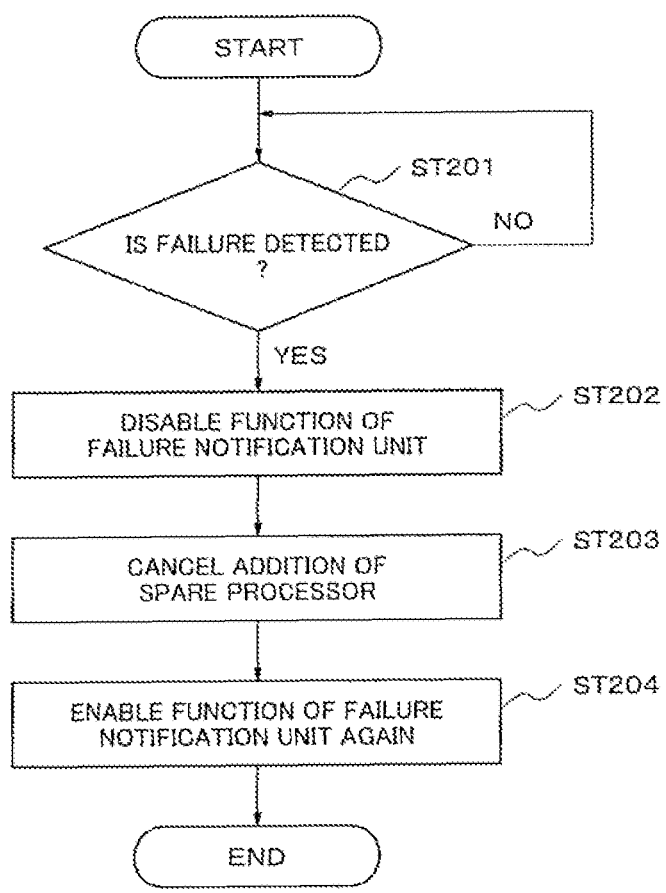
FIG. 4 is a flow chart showing an operation of a failure management unit.

FIG. 4 is a flow chart showing an operation of the failure management unit 60. The operation of the failure management unit 60 will be described with reference to FIG. 4.

The memory failure notification control section 61 monitors whether or not the failure occurs in the memory area 29 by monitoring the output of the failure detection unit 51 of the memory controller 50 during the second initialization process performed by the second initialization unit 36 (step ST201). When the memory failure notification control section 61 detects the occurrence of a failure of the memory area 29, the memory failure notification control section 61 disables the function of the failure notification unit 52 of the memory controller 50 (step ST202). Note that the failure which occurs in the memory area 29 is caused not by the operating processor 20 but by the spare processor 30. Accordingly, in order to prevent the operation stop of the partition in which the spare processor is added due to such failure, the memory failure notification control section 61 stops notifying the failure occurrence by disabling the function of the failure notification unit 52 in the memory controller 50.

Next, the memory failure detection section 62 cancels the addition of the spare processor 30 and makes the failure log detection unit 53 output the log data (step ST203). Next, the memory failure notification control section 61 enables the function of the failure notification unit 52 again (step ST204).

By the above mentioned operations, the failure management unit 60 can respond to the failure that occurs in the memory area 29 during the second initialization process.

As mentioned above, when the memory failure notification control section 61 detects that the failure occurs in the memory area 29 during the second initialization process, the memory failure notification control section 61 disables the failure notification function of the failure notification unit 52 and the memory failure detection section 62 cancels the addition of the spare processor 30. This configuration has advantages in which the decrease of the reliability caused by the use of the memory 28 in the operating processor 20 when the spare processor 30 is dynamically added can be avoided.

Third Exemplary Embodiment

Figure 5:
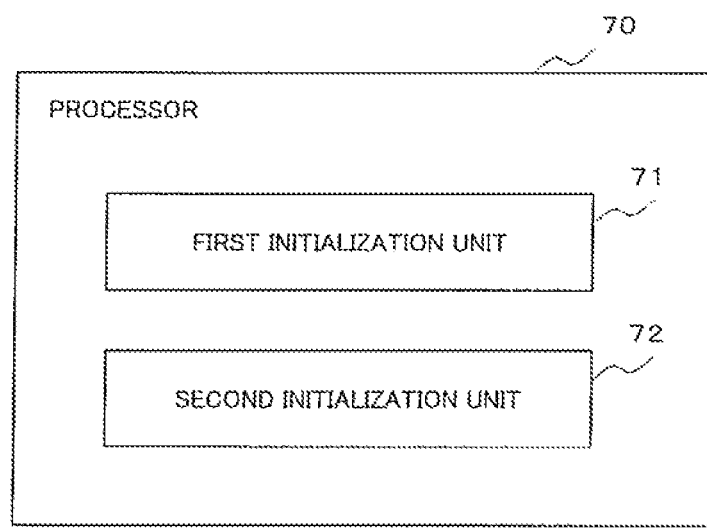
FIG. 5 is a block diagram showing a configuration of a processor according to a third exemplary embodiment of the present invention.
Figure 6:
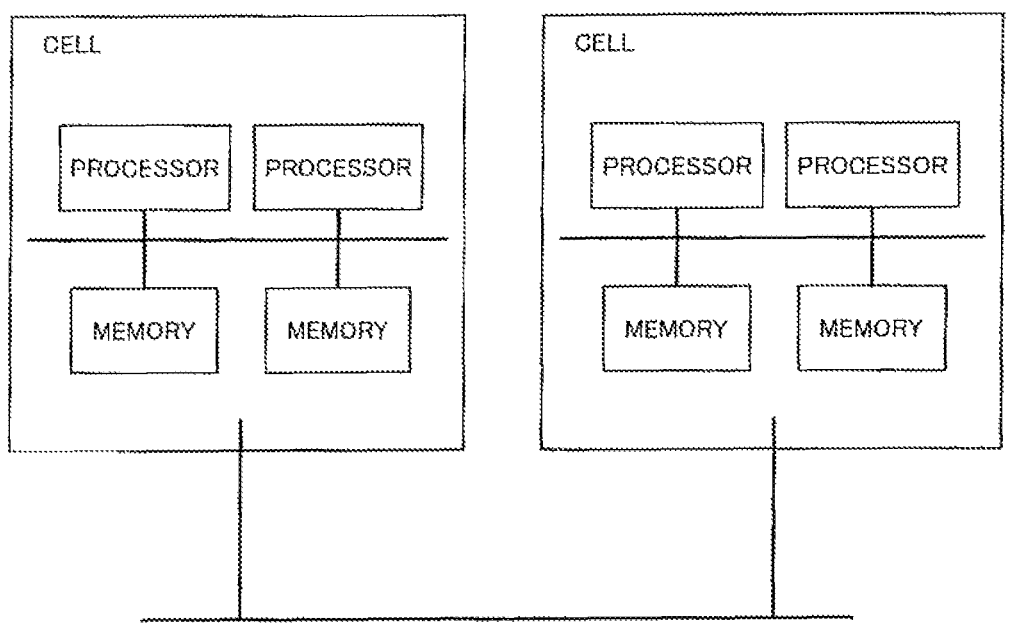
FIG. 6 is a block diagram showing a configuration of a system which is composed of cell unit modules, each including a processor and a memory.

FIG. 5 is a block diagram showing a configuration of a processor 70 according to a third exemplary embodiment. As shown in FIG. 5, the processor 70 includes a first initialization unit 71 and a second initialization unit 72.

The first initialization unit 71 reads a first program for checking a reliability of the processor into a cache memory and executes the first program when the processor 70 is started up. The second initialization unit 72 reads a second program for checking the reliability of the cache memory into a predetermined memory area and executes the second program when the second initialization unit 72 receives a notification indicating the completion of an establishment of a communication path between the predetermined memory area and the processor 70 from another processor which exists in a partition in which the processor 70 is added.

The configuration according to the third exemplary embodiment has advantages in which the processor with no memory for the initialization process can be dynamically added to a server system without affecting the partition in which the spare processor is added.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

(Further exemplary embodiment 1) A processor comprising:

a first initialization unit which reads a first program for checking a reliability of the processor into a cache memory and executes the first program when the processor is started up; and a second initialization unit which reads a second program for checking a reliability of the cache memory into a predetermined memory area and executes the second program when the second initialization unit receives a notification indicating the completion of the establishment of a communication path between the predetermined memory area and the processor from another processor which exists in a partition in which the processor is added.

(Further exemplary embodiment 2) A processor according to Supplement 1, wherein the cache memory is included in the processor and the predetermined Memory area is included in the another processor which exists in the partition in which the processor is added.

(Further exemplary embodiment 3) A processor according to Supplement 1, further comprising:

a failure notification control unit which disables a failure notification function provided in the another processor which exists in the partition in which the processor is added when a failure occurs in the memory area during a process performed by the second initialization unit.

Further exemplary embodiment 4) A processor according to Supplement 1, further comprising:

an addition cancellation unit which cancels the addition of the processor when a failure occurs in the memory area during the process performed by the second initialization unit.

(Further exemplary embodiment 5) A processor according to Supplement 4, wherein the failure notification control unit enables the failure notification function again when the addition of the processor is canceled.

(Further exemplary embodiment 6) A processor according to Supplement 1, wherein the processor employs Common System Interface.

(Further exemplary embodiment 7) A processor including:

a memory allocating unit which allocates a memory area for an initialization of another processor when a notification indicating the addition of the another processor to a partition in which the processor exists is received; and a routing unit which establishes a communication path between the allocated memory area and the another processor and notifies the another processor of the completion of the establishment of the communication path.

(Further exemplary embodiment 8) A server system comprising a first processor and a second processor which exists in a partition in which the first processor is added, wherein the second processor includes:

a memory allocating unit which allocates a memory area for the initialization of the first processor when a notification indicating the addition of the first processor to the partition in which the second processor exists is received; and a routing unit which establishes a communication path between the allocated memory area and the first processor and notifies the first processor of the completion of the establishment of the communication path and the first processor includes:

a first initialization unit which reads a first program for checking the reliability of the first processor into a cache memory and executes the first program when the first processor is started up; and a second initialization unit which reads a second program for checking the reliability of the cache memory into the memory area and executes the second program when a notification indicating the completion of the establishment of the communication path is received from the second processor.

(Further exemplary embodiment 9) A server system according to Supplement 8, wherein the cache memory is included in the first processor and the memory area is included in the second processor.

(Further exemplary embodiment 10) A server system according to Supplement 8, wherein the first processor further includes a failure notification control unit which disables a failure notification function provided in a processor which exists in the partition in which the first processor is added when a failure occurs in the memory area during the process performed by the second initialization unit.

(Further exemplary embodiment 11) A server system according to Supplement 8, wherein
the first processor further includes
an addition cancellation unit which cancels the addition of the processor when a failure occurs in the memory area during the process performed by the second initialization unit.

(Further exemplary embodiment 12) A server system according to Supplement 11, wherein
the failure notification control unit enables the failure notification function again when the addition of the processor is canceled.

(Further exemplary embodiment 13) A server system according to Supplement 8, wherein
the first processor and the second processor each employ Common System Interface.

(Further exemplary embodiment 14) A method for adding a processor comprising the steps of:
reading a first program for checking a reliability of a first processor into a cache memory and executing the first program;
reading a second program for checking a reliability of the cache memory into a predetermined memory area and executing the second program when a notification indicating the completion of the establishment of a communication path between the predetermined memory area and a first processor is received from a second processor which exists in a partition in which the first processor is added.

(Further exemplary embodiment 15) A method for adding a processor according to Supplement 14, further comprising:
disabling a failure notification function provided in the second processor which exists in the partition in which the first processor is added when a failure occurs in the predetermined memory area during the process for checking the reliability of the cache memory.

(Further exemplary embodiment 16) A method for adding a processor according to Supplement 14, further comprising:
canceling the addition of the first processor when a failure occurs in the predetermined memory area during the process for checking the reliability of the cache memory.

(Further exemplary embodiment 17) A method for adding a processor according to Supplement 16, further comprising:
enabling the failure notification function again when the addition of the first processor is canceled.

(Further exemplary embodiment 18) A method for adding a processor including the steps of:
allocating a memory area for an initialization of a processor when a notification indicating the addition of the processor to a partition in which another processor exists is received; and
establishing a communication path between the allocated memory area and the processor and notifying the processor of the completion of the establishment of the communication path.

(Further exemplary embodiment 19) A method for adding a processor including the steps of:
allocating a memory area for an initialization of a processor when a notification indicating the addition of the processor to a partition in which another processor exists is received;
establishing a communication path between the allocated memory area and the processor and notifying the processor of the completion of the establishment of the communication path;
reading a first program for checking the reliability of the processor into a cache memory and executing the first program; and
reading a second program for checking the reliability of the cache memory into the allocated memory area and executing the second program when a notification indicating the completion of the establishment of a communication path is received.

(Further exemplary embodiment 20) A program for adding a processor which allows a computer to perform:
a process to read a first program for checking reliability of a first processor into a cache memory and execute the first program; and
a process to read a second program for checking the reliability of the cache memory into a predetermined memory area and execute the second program when a notification indicating the completion of the establishment of a communication path between the predetermined memory area and a first processor is received from a second processor which exists in a partition in which the first processor is added.

(Further exemplary embodiment 21) A program for adding a processor according to Supplement 20 which further allows a computer to perform
a process to disable a failure notification function provided in the second processor which exists in the partition in which the first processor is added when a failure occurs in the memory area during the process for checking the reliability of the cache memory.

(Further exemplary embodiment 22) A program for adding a processor according to Supplement 20 which further allows a computer to perform
a process to cancel the addition of the first processor when a failure occurs in the memory area during the process for checking the reliability of the cache memory.

(Further exemplary embodiment 23) A program for adding a processor according to Supplement 22 which further allows a computer to perform
a process to enable the failure notification function again when the addition of the first processor is canceled.

(Further exemplary embodiment 24) A program for adding a processor which allows a computer to perform
a process to allocate a memory area for an initialization of a processor when a notification indicating the addition of the processor to a partition in which another processor exists is received; and
a process to establish a communication path between the allocated memory area and the processor and notify the processor of the completion of the establishment of the communication path.

(Further exemplary embodiment 25) A processor including:
memory allocating means for allocating a memory area for an initialization of another processor when a notification indicating the addition of the another processor to a partition in which the processor exists is received; and
routing means for establishing a communication path between the allocated memory area and the another processor and notifying the another processor of the completion of the establishment of the communication path.

(Further exemplary embodiment 26) A processor comprising:
a first initialization means for reading a first program for checking a reliability of the processor into a cache memory and executing the first program when the processor is started up; and
a second initialization means for reading a second program for checking a reliability of the cache memory into a predetermined memory area and executing the second program when the second initialization means receives a notification indicating the completion of the establishment of a communication path between the predetermined memory area and the processor from another processor which exists in a partition in which the processor is added.

(Further exemplary embodiment 27) A server system including a first processor and a second processor which exists in a partition in which the first processor is added, wherein the second processor includes:

memory allocating means for allocating a memory area for the initialization of the first processor when a notification indicating the addition of the first processor to a partition in which the second processor exists is received; and routing means for establishing a communication path between the allocated memory area and the first processor and notifying the first processor of the completion of the establishment of the communication path and the first processor includes:

first initialization means for reading a first program for checking the reliability of the first processor into a cache memory and executes the first program when the first processor is started up; and second initialization means for reading a second program for checking the reliability of the cache memory into the allocated memory area and executes the second program when a notification indicating the completion of the establishment of the communication path is received from the second processor.

The invention claimed is:

1. A processor which is added to a server system, comprising:
a first initialization unit which reads a first program for checking a reliability of said processor into a cache memory which is included in the processor in response to an instruction by the server system to add the processor into the server system and executes said first program;
a link establishing unit which establishes a link between said processor and another processor which exists in said server system after the completion of said first program; and
a second initialization unit which reads a second program for checking a reliability of said cache memory into a predetermined memory area and executes said second program when said second initialization unit receives a notification indicating the completion of the establishment of a communication path between said predetermined memory area and said processor from another processor which exists in a partition in which said processor is added, the communication path is established after the link between the processor and another processor is established by the link establishing unit.

2. The processor according to claim 1, wherein
said cache memory is included in said processor and said predetermined memory area is included in said another processor which exists in the partition in which said processor is added.

3. The processor according to claim 1, further comprising:
a failure notification control unit which disables a failure notification function provided in the another processor which exists in said partition in which said processor is added when a failure occurs in said memory area during a process performed by said second initialization unit.

4. The processor according to claim 1, further comprising:
an addition cancellation unit which cancels the addition of said processor when a failure occurs in said memory area during the process performed by said second initialization unit.

5. The processor according to claim 4, wherein
said failure notification control unit enables said failure notification function again when the addition of said processor is canceled.

6. The processor according to claim 1, wherein
said processor employs Common System Interface.

7. A server system comprising:
a first processor, and
a second processor which exists in a partition in which said first processor is added,
wherein:
said second processor includes:
a memory allocating unit which allocates a memory area for the initialization of said first processor when a notification indicating the addition of said first processor to the partition in which said second processor exists is received; and
a routing unit which establishes a communication path between said allocated memory area and said first processor and notifies said first processor of the completion of the establishment of the communication path;
said first processor includes:
a first initialization unit which reads a first program for checking the reliability of said first processor into a cache memory which is included in said first processor in response to an instruction by the server system to add the first processor into the server system and executes said first program;
a link establishing unit which establishes a link between said first processor and another processor which exists in said server system after the completion of said first program; and
a second initialization unit which reads a second program for checking the reliability of said cache memory into said memory area and executes said second program when a notification indicating the completion of the establishment of said communication path is received from said second processor; and
said communication path is established after said link, between said first processor and said another processor, is established by the link establishing unit.

8. The server system according to claim 7, wherein
said cache memory is included in said first processor and said memory area is included in said second processor.

9. The server system according to claim 7, wherein
said first processor further includes
a failure notification control unit which disables a failure notification function provided in a processor which exists in said partition in which said first processor is added when a failure occurs in said memory area during the process performed by said second initialization unit.

10. The server system according to claim 7, wherein
said first processor further includes
an addition cancellation unit which cancels the addition of the processor when a failure occurs in said memory area during the process performed by said second initialization unit.

11. The server system according to claim 10, wherein
said failure notification control unit enables said failure notification function again when the addition of the processor is canceled.

12. The server system according to claim 7, wherein
said first processor and said second processor each employ Common System Interface.

13. A method, for adding a processor to a server system, comprising:
- reading a first program for checking a reliability of a first processor into a cache memory and executing the first program;
- establishing a link between said first processor and another processor which exists in said server system after the completion of said first program; and
- reading a second program for checking a reliability of said cache memory into a predetermined memory area and executing said second program when a notification indicating the completion of the establishment of a communication path between said predetermined memory area and a first processor is received from a second processor which exists in a partition in which said first processor is added;
- wherein the establishment of the communication path takes place after the establishing of the link.

14. The method for adding a processor according to claim 13, further comprising:
- disabling a failure notification function provided in said second processor which exists in said partition in which said first processor is added when a failure occurs in said predetermined memory area during the process for checking the reliability of said cache memory.

15. The method for adding a processor according to claim 13, further comprising:
- canceling the addition of said first processor when a failure occurs in said predetermined memory area during the process for checking the reliability of said cache memory.

16. The method for adding a processor according to claim 15, further comprising:
- enabling said failure notification function again when the addition of said first processor is canceled.

* * * * *